(12) United States Patent
Lee

(10) Patent No.: US 10,007,245 B2
(45) Date of Patent: Jun. 26, 2018

(54) PLC SYSTEM AND OPERATING METHOD THEREOF

(71) Applicant: LSIS CO., LTD., Anyang-si, Gyeonggi-do (KR)

(72) Inventor: Geon Ho Lee, Cheonan-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 336 days.

(21) Appl. No.: 14/884,460

(22) Filed: Oct. 15, 2015

(65) Prior Publication Data
US 2016/0124413 A1 May 5, 2016

(30) Foreign Application Priority Data

Oct. 30, 2014 (KR) ........................ 10-2014-0148902

(51) Int. Cl.
*G05B 19/05* (2006.01)
(52) U.S. Cl.
CPC .... *G05B 19/05* (2013.01); *G05B 2219/14055* (2013.01); *G05B 2219/25265* (2013.01); *G05B 2219/34038* (2013.01)

(58) Field of Classification Search
None
See application file for complete search history.

(56) References Cited

U.S. PATENT DOCUMENTS

| 6,567,863 B1 | 5/2003 | Lafuite et al. |
| 6,701,284 B1 * | 3/2004 | Huntley ................. G05B 19/05 702/187 |
| 6,845,401 B1 | 1/2005 | Papadopoulos et al. |
| 7,487,316 B1 * | 2/2009 | Hall ..................... G05B 19/058 700/87 |
| 2003/0033221 A1 * | 2/2003 | Fuwa .................. G06Q 10/087 705/26.2 |
| 2006/0041323 A1 * | 2/2006 | Chai .................... G05B 19/056 700/18 |
| 2012/0290539 A1 * | 11/2012 | Bryant .................. G05B 19/05 707/661 |
| 2014/0012402 A1 * | 1/2014 | Nishiyama ............. G05B 19/05 700/86 |

FOREIGN PATENT DOCUMENTS

| CN | 102081393 A | 6/2011 |
| CN | 103140846 A | 6/2013 |

(Continued)

OTHER PUBLICATIONS

"smxFS Users Guide", Micro Digitall, Version 2.02, Sep. 27, 2008, by Yingbo Hu and David Moore (83 pages).*

(Continued)

*Primary Examiner* — Tuan Do
(74) *Attorney, Agent, or Firm* — K&L Gates LLP

(57) ABSTRACT

A programmable logic controller (PLC) system is provided. The programmable logic controller (PLC) system divides a memory region into a plurality of regions according to a function, and reads or transmits data from or to the divided regions according to an operation mode to be performed, wherein the plurality of regions obtained through division includes: a first storage region storing log data on the PLC system; and a second storage region storing a hyper text markup language (HTML) file.

5 Claims, 4 Drawing Sheets

(56) References Cited

FOREIGN PATENT DOCUMENTS

| | | |
|---|---|---|
| JP | 2010-039737 | 2/2010 |
| JP | 2014106969 | 6/2014 |
| KR | 10-1998-0029020 | 7/1998 |
| KR | 10-2010-0125751 | 12/2010 |
| KR | 10-2012-0111616 | 10/2012 |
| KR | 10-2013-0058057 | 6/2013 |
| WO | 2012/134491 | 10/2012 |

OTHER PUBLICATIONS

European Patent Office Application Serial No. 15191619.4, Search Report dated Mar. 7, 2016, 8 pages.
Japan Patent Office Application Serial No. 2015-213941, Office Action dated Aug. 30, 2016, 2 pages.
Korean Intellectual Property Office Application Serial No. 10-2014-0148902, Office Action dated Nov. 12, 2015, 3 pages.
Chinese Office Action from related Chinese Application No. 201510711722.2; action dated Oct. 10, 2017; (7 pages).

\* cited by examiner

FIG.4

```
//A:Drive Setting(Partition 1)
sfs_devreg(sfs_GetMMCSD0Interface(),0);
//B:Drive Setting(Partition 2)
sfs_devreg(sfs_GetMMCSD1Interface(),1);
```

PLC SYSTEM AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2014-0148902, filed on Oct. 30, 2014, the contents of which are hereby incorporated by reference herein in its entirety.

BACKGROUND

The present disclosure relates to a programmable logic controller (PLC) system, and more particularly, to a PLC system that may divide memory cards in the PLC system according to a function to minimize a time taken to search the memory card.

An automation facility at the industrial site is configured by mechanical equipment including a relay, etc. In order to change the automation facility including the mechanical equipment, there is a difficulty of changing the wiring of the internal circuit of the facility. In order to overcome such a difficulty, a PLC is used.

The PLC generally performs a function similar to a computer. That is, the PLC receives a signal coming from the facility, processes the signal according to programming in the PLC and then outputs the processed signal to the facility. That is, the smoothness of the operation of the PLC means that automation facilities in the factory are efficiently operating.

FIG. 1 is a block diagram for explaining the operation of a typical PLC system.

Typically, a memory card 20 is installed in the PLC system 10 in order to be capable of mutually transmit and receive data.

A micro processing unit (MPU) 11 operates according to a set program to control the entire PLC system 10 and enables, especially, a data log module 12 and a web server module 13 to operate.

The data log module 12 performs a data log function according to the control of the MPU 11. That is, it collects a device value set in a programmable and debugging tool (PADT) and transmits the collected value to the memory card 20.

The web server module 13 performs a web server function according to the control of the MPU 11. That is, it transmits a hyper text markup language (HTML) file stored in the memory card 20 to a web browser.

A file system 14 is structured so that a search for and access to files or data in the memory card 20, data output from the data log module 12 is transmitted to the memory card 20 through the file system 14, and data transmitted from the memory card 20 is delivered to the web server module 13 through the file system 14.

The memory card 20 stores data transmitted from the PLC system 10 in a comma separated value (CSV) file and previously stores an HTML file in order to transmit a web page.

As such, the data log and the web server are functions that use the memory card, and the data log module 12 and the web server module 13 alternately accesses the memory card 20 to read data from the memory card or write data to the memory card.

In this example, when many modules access the memory card 20 to read data from the memory card or write data to the memory card, there is a limitation in that it takes a long time to search for a sector in the memory card 20.

SUMMARY

Embodiments provide a PLC system that divides a memory card in the PLC system according to a function to be capable of reducing a time taken to search the memory card.

According to an embodiment, the PLC system divides the memory card into a CSV file storage region and an HTML file storage region, stores log data in the CSV file storage region, and reads the HTML file from the HTML file storage region.

Thus, since the region of the memory card which the PLC system accesses varies according to the function to be performed, it is possible to reduce a time taken to search the memory card in order to allow the PLC system to read or write data.

In one embodiment, a programmable logic controller (PLC) system divides a memory region into a plurality of regions according to a function, and reads or transmits data from or to the divided regions according to an operation mode to be performed, wherein the plurality of regions obtained through division includes: a first storage region storing log data on the PLC system; and a second storage region storing a hyper text markup language (HTML) file.

In another embodiment, an operating method of a PLC system includes dividing a memory according to a function in initialization operation when a driving request is sensed; sensing an operation mode according to the driving request; and reading or writing data from or to the divided memory according to the sensed operation mode, wherein the plurality of regions obtained through division includes: a first storage region storing log data on the PLC system; and a second storage file storing an HTML file.

The details of one or more embodiments are set forth in the accompanying drawings and the description below. Other features will be apparent from the description and drawings, and from the claims.

BRIEF DESCRIPTION OF THE DRAWINGS

FIG. 4 is an example of a code used when the PLC system according to an embodiment divides a memory card.

DETAILED DESCRIPTION OF THE EMBODIMENTS

Figure 1:
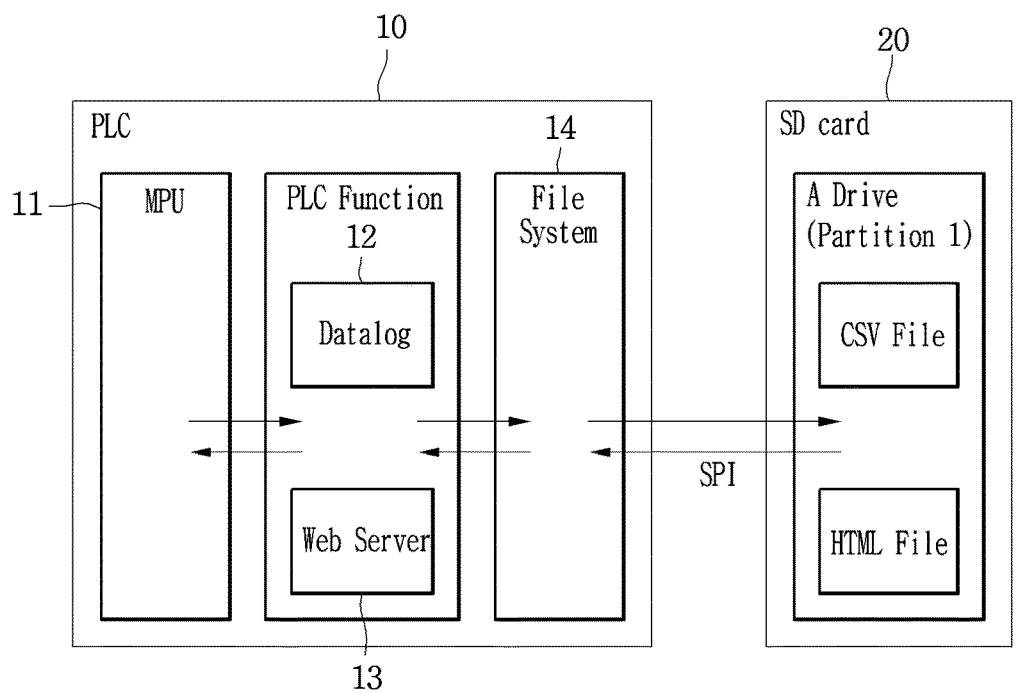
FIG. 1 is a block diagram for explaining the operation of a typical PLC system.

The terms or words used in the detailed description and claims should not be imitatively construed as typical meanings or meanings indicated in dictionaries but should be construed as meanings and concepts matching the technical spirit of the inventive concept based on the principle that the inventor may properly define the concepts of terms in order to describe his or her invention in the best mode.

Thus, since embodiments described in the detailed description and configurations shown in the drawings are only examples and do not cover all the technical spirits of an embodiment, it should be understood that there may be various equivalents and variations that may replace them upon filing the present application.

Figure 2:
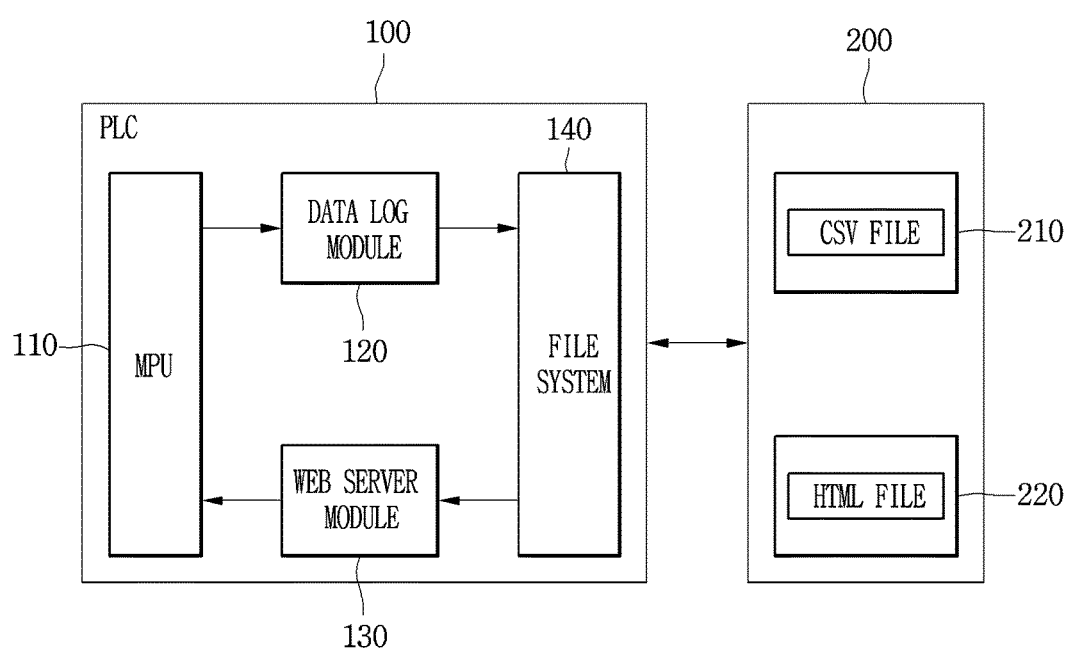
FIG. 2 is a block diagram of a PLC system according to an embodiment.

FIG. 2 is a block diagram of a PLC system according to an embodiment.

Referring to FIG. 2, a PLC system 100 according to an embodiment may be connected to a memory card 200 to transmit collected log data to the memory card 200 or read an HTML file from the memory card 200 to transmit the read file to a web browser.

In this case, data transmission between the PLC system 100 and the memory card 200 may be performed by serial peripheral interface (SPI) communication. In addition to the above communication method, the data transmission between the PLC system 100 and the memory card 200 may be implemented by various communication methods.

The PLC system 100 may include a micro processing unit (MPU) 110, a data log module 120, a web server 130, and a file system 140.

The MPU 110 may operate according to a set program to control the entire PLC system 100. In particular, it is possible to control the data log module 120 and the web server module 130.

The data log module 120 may perform a data log function according to the control of the MPU 110. The data log module 120 may collect a device value ('log data') set in a programmable and debugging tool (PADT).

Log data collected by the data log module 120 may be stored in the memory card 200 via the file system 140.

The web server module 130 performs a web server function according to the control of the MPU 110. That is, it may transmit an HTML file stored in the memory card 200 to a web browser.

The file system 140 may perform data transmission between the data log module 120 and the memory card 200 and data transmission between the web server module 130 and the memory card 200.

That is, the file system 140 may receive log data from the data log module 120 to transmit the received data to the memory card 200, and receive an HTML file from the memory card 200 to transmit the received file to the web server module 130.

In this case, when the file system 140 is initialized after the execution of the PLC system 100, the file system 140 may divide the memory card 200 according to a function. That is, the file system 140 may divide the memory card 200 into a comma separated values (CSV) file storage region 210 for storing log data and an HTML file storage region 220 for storing an HTML file. In addition, the file system 140 may divide the memory card 200 into more storage regions according to a function.

In the case of performing log data transmission, the file system 140 may transmit log data to the CSV file storage region 210 of the memory card 200, and in the case of performing the operation of reading the HTLM file, the file system may access the HTML file storage region 220 of the memory card 200 to read the HTML file.

The memory card 200 that is connected to the PLC system 100 according to an embodiment to transmit and receive data stores data received from the PLC system 100 in a CSV file and previously stores an HTML file for transmitting a web page.

In this case, the memory card 200 may be divided into the CSV file storage region 210 and the HTML file storage region 220 by the PLC system 100 according to an embodiment.

Thus, the memory card 200 may receive log data from the PLC system 100 and stores the received data in the CSV file storage region 210, and when there is a request from the PLC system 100, the memory card may transmit the HTML file stored in the HTML file storage region 220 to the PLC system 100.

The configuration and function of the PLC system according to an embodiment has been described above. In the following, the particular operation of the PLC system that has the configuration as shown in FIG. 2 is described in detail with reference to the accompanying drawings.

Figure 3:
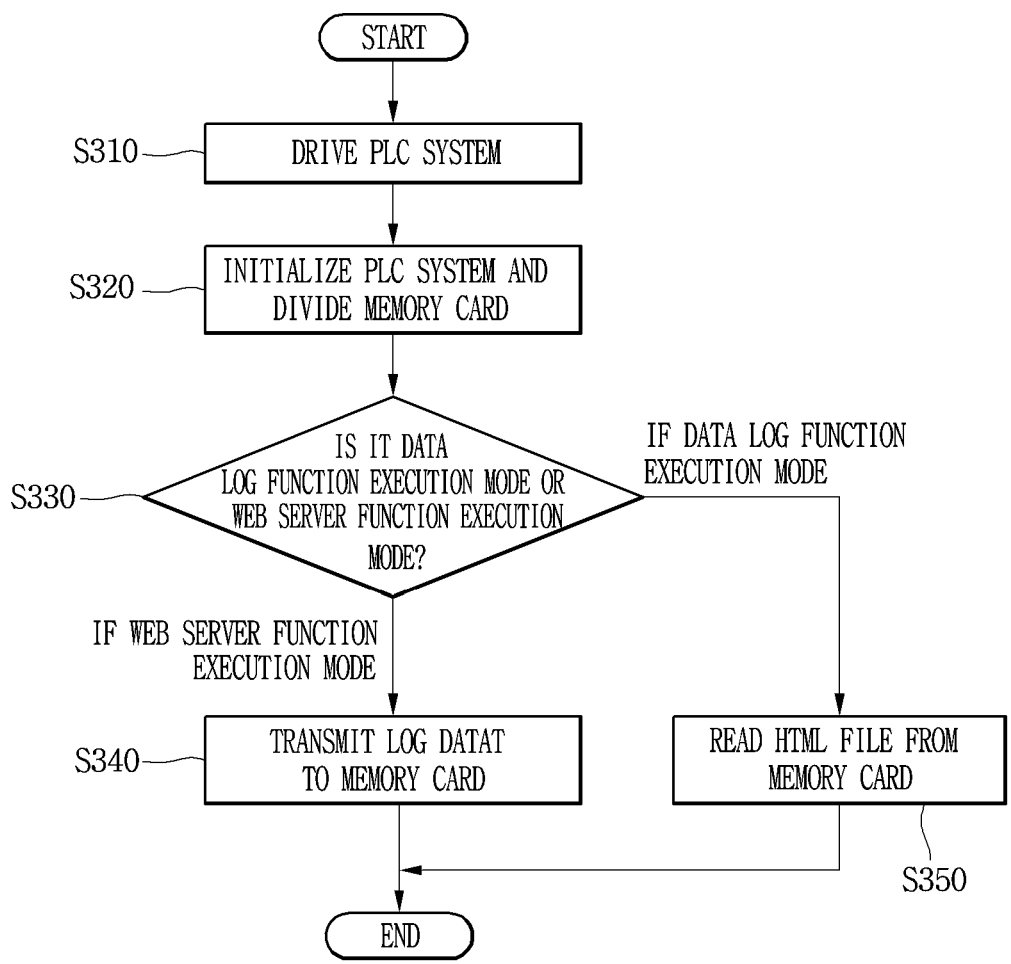
FIG. 3 is a flowchart for explaining the sequence of operation of the PLC system according to an embodiment.

FIG. 3 is a flowchart for explaining the operation of a PLC system according to an embodiment.

Referring to FIG. 3, when a request for a driving mode for a PLC system 100 is sensed in step S310, the PLC system 100 may be initialized and it is possible to divide a memory card 200 according to a function in step S320. Such a division of the memory card 200 may be performed by a file system 140 of the PLC system 100.

That is, the file system 100 divides the memory card 200 into a CSV file storage region 210 for storing log data and an HTML file storage region 220 for storing an HTML file.

When the PLC system 100 divides the memory card 200, the PLC system 100 may divide the memory card 200 by using the function sfs_devreg( ) as shown in FIG. 4.

As such, the PLC system 100 divides the memory card 200 in the initialization process in step S320, and then the PLC system 100 may determine the current operation mode in step S330. Specifically, the PLC system 100 may determine whether the current state is a data log function execution mode or a web server function execution mode in step S330.

When it is determined that the current operation mode is the data log function execution mode, the PLC system 100 may transmit collected log data to the memory card in step S340. In this case, the PLC system 100 may transmit log data to the CSV file storage region 210 of the memory card 200.

On the contrary, when it is determined that the current operation mode is the web server function execution mode, the PLC system 100 may read an HTML file from the memory card 200 in step S350. In this case, the HTML file may be read from the HTML file storage region 220 of the memory card 200.

As described above, the PLC system according to an embodiment may divide the memory card into the CSV file storage region and the HTML file storage region, store the log data in the CSV file storage region, and read the HTML file from the HTML file storage region.

Thus, since the region of the memory card which the PLC system accesses varies according to the function to be performed, it is possible to minimize a time taken to search the memory card in order to allow the PLC system to read or write data.

Exemplary embodiments are mainly described above. However, they are only examples and do not limit the inventive concept. A person skilled in the art may appreciate that many variations and applications not presented above may be implemented without departing from the essential characteristic of embodiments. For example, each component specifically represented in embodiments may vary. In addition, it should be construed that differences related to such a variation and such an application are included in the scope of the inventive concept defined in the following claims.

What is claimed is:

1. A programmable logic controller (PLC) system connected to a memory card, wherein the PLC system comprises:

a data log module, which when executed by a microprocessor in the PLC system, executes a data log function execution mode;

a web server module, which when executed by the microprocessor, executes a web server function execution mode; and a file system, which when executed by the microprocessor, controls the memory card to be divided into a plurality of regions corresponding to a plurality of functions, respectively, when the file system is initialized, wherein the plurality of regions obtained through the division comprises:

a first storage region storing log data of the PLC system; and a second storage region storing a hyper text markup language (HTML) file, wherein the file system is configured to:

transmit the log data to store the log data into the first storage region of the memory card when the data log function execution mode is sensed, and read the HTML file from the second storage region of the memory card when the web server function execution mode is sensed.

2. The programmable logic controller (PLC) system according to claim 1, wherein the log data is stored in a comma separated value (CSV) file.

3. The programmable logic controller (PLC) system according to claim 1, wherein the PLC system uses a memory division function to divide the memory card when the file system is initialized.

4. An operating method of a PLC system connected to a memory card, the operating method comprising:

dividing, by a microprocessor in the PLC system, the memory card into a first storage region and a second storage region, the first storage region storing log data of the PLC system, and the second storage region storing a hypertext markup language (HTML) file when the file system is initialized;

sensing, by the microprocessor, if a data log function execution mode is executed by a data log module or a web server function execution mode is executed by a web server module;

transmitting, by the microprocessor, the log data to store the log data into the first storage region of the memory card when the data log function execution mode is sensed; and reading, by the microprocessor, the HTML file from second storage region of the memory card when the web server function execution mode is sensed.

5. The operating method according to claim 4, wherein the dividing of the memory card is performed based on a function sfs_devreg( ).

* * * * *